Dec. 17, 1968   C. S. OCHS   3,416,360
DUD DETECTOR FOR SMALL DIAMETER CAPS
Filed Oct. 19, 1966   2 Sheets-Sheet 1
FIG. 1
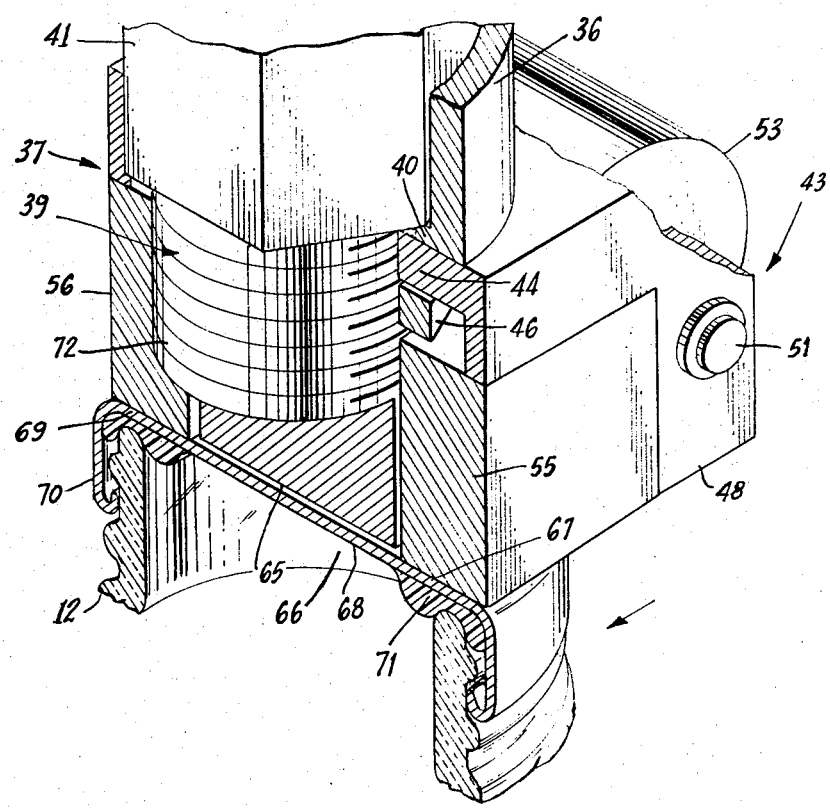
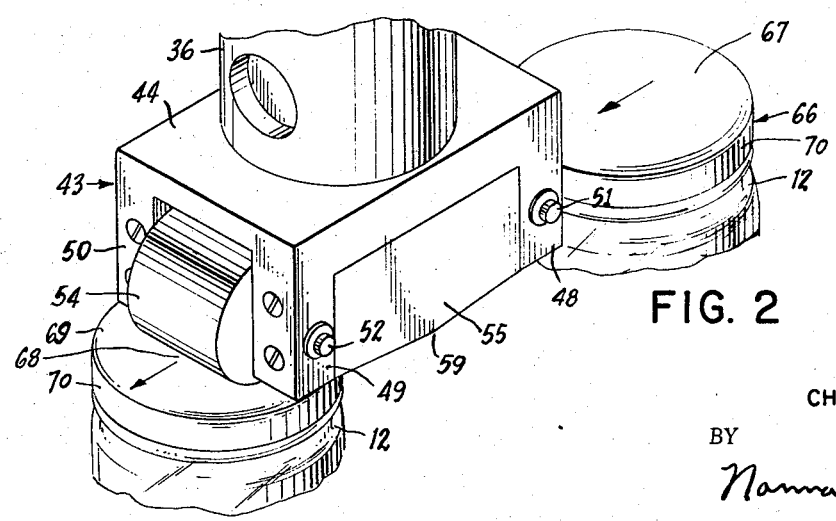
FIG. 2
INVENTOR.
CHARLES S. OCHS
BY
Norman N Holland
ATTORNEY Dec. 17, 1968

C. S. OCHS 3,416,360

DUD DETECTOR FOR SMALL DIAMETER CAPS

Filed Oct. 19, 1966

INVENTOR.
CHARLES S. OCHS
BY
*Naman N Holland*
ATTORNEY

United States Patent Office 3,416,360
Patented Dec. 17, 1968

3,416,360
DUD DETECTOR FOR SMALL DIAMETER CAPS
Charles S. Ochs, Lancaster, Ohio, assignor to Anchor Hocking Glass Corporation, Lancaster, Ohio, a corporation of Delaware
Filed Oct. 19, 1966, Ser. No. 587,906
12 Claims. (Cl. 73—52)

The present invention relates to the detection of the relationship of the internal and external pressures on a container and particularly the presence or absence of an adequate vacuum in containers sealed by caps or closures. The invention is directed particularly to the inspection of containers having caps of small diameters.

There have been several types of apparatus developed for inspecting sealed containers packaging perishable foods to determine if a satisfactory vacuum has been attained in the container in order to preserve the perishable foods. Many of these apparatus utilized sensing devices which are positioned over the tops of the containers.

These apparatus are directed particularly to sensing the center panel or portion of a cap on a glass jar. The center panel may be made of thin sheet material, such as metal, which readily flexes under pressure. If a satisfactory vacuum has been developed within the container, the atmospheric pressure depresses the center panel or portion of the cap usually into a concave shape. If a satisfactory vacuum has not been developed, the pressure differential between the atmosphere and the internal pressure in the container is not sufficient to depress the panel and it assumes an outwardly convex shape or a flat shape. The sensing element is positioned in relation to the center panel so that an upwardly convex or flat panel indicating a lack of proper vacuum is sensed by the element and the sealed container is rejected. If the center panel is depressed and spaced from the sensing element, the container passes through and is accepted.

One of the problems in developing these inspection apparatus is the precise positioning of the sensing element in relation to the center panel without creating a false sensing of other portions of the closure. The false sensing results in a rejection of containers with proper vacuums.

This problem has been overcome for large diameter caps by various types of inspecting apparatuses. However difficulties have been encountered in providing an inspection apparatus which will probably position the sensing element for inspecting small diameter caps without the sensing element creating a false rejection by sensing the edge of the closure rather than the center panel.

An object of the invention is to provide an inspection apparatus for testing containers sealed by small diameter caps.

Another object of the invention is to provide a detection apparatus for testing small diameter caps that only senses the position of the center panel or portion of the cap.

Another object of the invention is to provide a cap sensing apparatus that does not respond to the edge of the cap.

Another object of the present invention is to provide improved detection mechanism for sealed packages having top panels which is readily adaptable to present inspection apparatus.

Other and further objects of the invention will be obvious on an understanding of the illustrative embodiment about to be described, or will be indicated in the appended claims, and various advantages not referred to herein will occur to one skilled in the art upon employment of the invention in practice.

FIG. 1 is a sectional perspective view of the detection mechanism with the section taken through the central axis of the sensing element and container;

FIG. 2 is a perspective view of the detection mechanism inspecting sealed containers;

Figure 9:
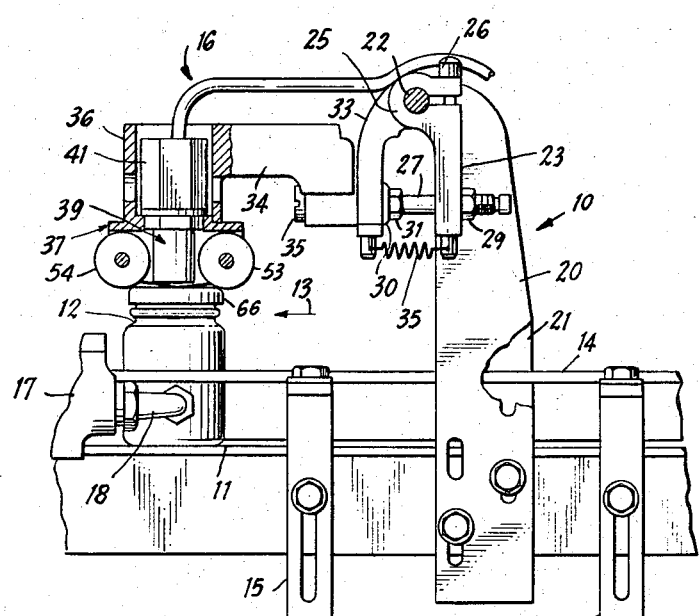
FIG. 9 illustrates the mounting of the detecting mechanism on a conventional detecting apparatus.

Referring to FIG. 9 of the drawings, a side view of the dud detector machine 10 is illustrated. A moving belt 11 supports and moves containers or jars 12 in the direction indicated by the arrow 13. Guide rails 14 are mounted on the brackets 15 adjustable horizontally and vertically in relation to the belt 11 for properly positioning the guide rails in relation to the containers 12. The containers 12 move underneath a dud detecting mechanism 16 for determining whether the container 12 sealed by a cap 66 has the proper vacuum. A rejection mechanism 17 is fragmentarily illustrated and has an air repect nozzle 18. If an unsatisfactory vacuum condition appears in the container 12, a blast of air from the nozzle 18 forces the container 12 laterally off the conveying belt 11 to remove unacceptable sealed containers. The rejection mechanism 17 is of a conventional type shown in the copending application Ser. No. 393,952 filed on Sept. 2, 1964, by Charles S. Ochs, now Patent No. 3,295,676, entitled "Detecting Mechanism."

The dud detecting or sensing mechanism 16 is pivotally mounted on the spaced supporting posts 20 and 21. The spaced supporting posts 20 and 21 are adjustably secured to the machine 10 on opposite sides of the belt for varying the vertical position of the dud detecting mechanism 16. A horizontal shaft 22 extends between the posts 20 and 21. The arm 33 is pivotally mounted on the shaft 22 and the detector supporting beam 34 is fastened to the arm by the bolt 35. The stop attachment 23 has two mountings 25 on opposite sides of the arm 33 for fixedly fastening the stop attachment 23 to the shaft 22 by the bolts 26. A bolt 27 is threaded in the stop attachment 23 and locked in place by the nut 29. The hexagonal head 31 on the bolt 27 forms a stop engaged by the boss 30 on the rotatable arm 33. The lowest position of the dud detecting mechanism, which is slightly below the top of the closures, is set by the position of the bolt 27. The spring 35 attached to the arm 33 and the stop attachment 23 holds the arm 33 against the hexagonal head 31 when the dud detecting mechanism 16 is not engaged by a closure.

Figure 7:
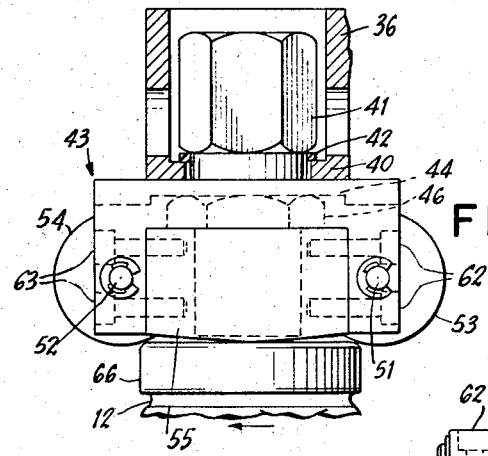
FIG. 7 is a side view of FIG. 6.

The sleevelike member 36 of the detecting mechanism 16 is part of the beam 34 and supports the detector or sensing means 39 and the guide and positioning means 37. The guide and positioning means 37 has a frame 43 (FIG. 1) with a panel 44. The detector 39 and guide means 37 are secured to the sleevelike member 36 by the nut 46 threading onto the threaded portion 72 of the detector 39 extending through the flange 40 and panel 44 to clamp the flange and panel between the nut 46 and the hexagonal head 41 of the detector. A metal washer 42 is positioned between and spaces the flange 40 and the head 41 (FIG. 7).

The panel 44 of the frame 43 (FIG. 1) is of a rectangular shape and has four posts, 47, 48, 49, 50 (FIGS. 2 and 8) extending perpendicularly from the panel at a respective corner. The detector 39 is centered in relation to the posts. Shafts 51, 52 are mounted in posts 47, 48 and 49, 50, respectively, and rotatably support rollers 53, 54. Rollers 53, 54 are cylindrical in shape and extend between the posts 47, 48 and posts 49, 50, respectively. The roller 53 is the leading roller initially engaged by the closure 66 of the container 12 (FIGS. 2 and 3) and the roller 54 is the trailing roller engaging the closure 66 on movement of the container from under the detection means (FIG. 5).

On the sides of the frame are positioning shoes 55, 56 between the posts 48, 49 and 47, 50, respectively. The shoes are generally rectangular in shape and have downwardly facing edge surfaces 57, 58 of a generally V shape with apexes 59, 60 midway of the detector 39. The shoes are secured to the posts by the bolts 61, 62, 63, 64 (FIG. 8) extending through a respective post longitudinally into the shoes. The apexes engage the reference portion of the caps and the shoes 55, 56 have a width to extend the apexes over a distance to engage caps of various diameters.

Figure 3:
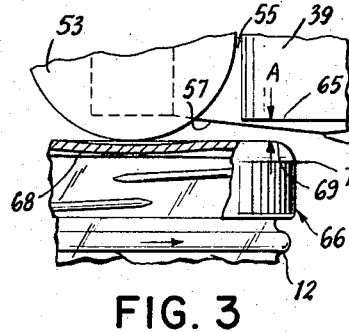
FIG. 3 is an enlarged fragmentary side view of the detection mechanism as viewed from the opposite side of FIG. 9 and illustrates the leading roller engaging the closure.
Figure 4:
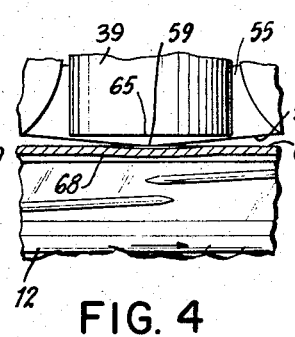
FIG. 4 is a side view of the detection mechanism similar to FIG. 3 and illustrates the sensing element in an inspecting position.
Figure 5:
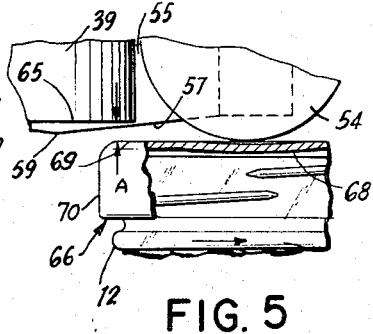
FIG. 5 is a side view of the detection mechanism similar to FIG. 3 and illustrates the trailing roller engaging the closure.
Figure 6:
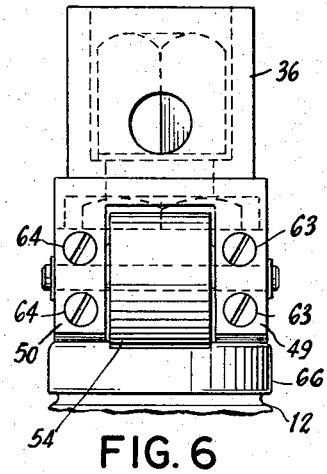
FIG. 6 is a trailing view of the detection mechanism with the sensing element positioned over the center panel.

The inspecting plane of the surface 65 of the detector or sensing means 39 is slightly recessed from the plane through the apexes 59 and 60 of the shoes (FIGS. 3 to 5). The apexes are slightly recessed from the plane tangential to the surface of the rollers. Thus the surface 65 is laterally spaced from the apexes 59, 60 and the portion of the surfaces of the rollers tangential to a common plane. The inspecting plane, the plane through the apexes and the roller tangential plane extend longitudinally or parallel to the horizontal movement of the top of the closures or caps and are laterally or vertically spaced.

The cap 66 is a conventional type with a planar top panel 67 and a downwardly dependent flange 70 for attaching the cap to the container 12. The cap is preferably made of metal. However, other suitable cap materials may be used. The panel 67 has a peripheral reference portion 69 held in position by the lip of the container 12 and a disc-shaped bendable or deformable portion 68 at the center. The gasket 71 on the inner surface of the cap forms a seal with the lip of the container in a conventional manner. Thus the containers with the sealing caps form sealed containers.

As illustrated in FIGS. 1 and 4 the apexes of the shoes position the surface 65 of the detector in a given spaced relation to the deformable or bendable portion 68 so that if the panel is flat the detector will sense the bendable portion 68 and the container 12 will be rejected as a dud (FIG. 4). If the bendable portion 68 is depressed in a concave shape, then no detection occurs and the container passes as acceptable.

The detector 39 may be of a conventional type as described in the aforementioned copending application Serial No. 393,952 and is held in its lowest position by the hexagonal head 31 of the bolt 27 (FIG. 9) engaging the boss 30 on the arm 33. This sets the dud detecting means so that the apexes of the shoes are below the panels 67 of the caps to be tested. As the container 12 is moved by the belt 11, the leading roller 53 is engaged by the cap 66. The leading roller lifts the detecting mechanism and rides along the cap and holds the surface 65 of the detector 39 a distance A above the peripheral or reference portion 69 in a non-detecting relationship to the cap 66 (FIG. 3). The axes of the rollers 53 and 54 are spaced so that the cap 66 can be positioned between the rollers without engaging either roller. When the leading roller 53 reaches the trailing portions of the cap 66, the cap 66 moves away from the roller and the apexes 59 and 60 engage the rim of the caps (FIG. 4) lowering the detection or sensing means in relation to the cap. It is at this instance the detector 39 senses the position of the deformable or bendable portion 68 to determine whether or not the container is to be accepted or rejected. The leading edge of the cap 66 then engages the trailing roller 54 (FIG. 5) to again raise the detector 39 to a non-detecting or non-inspecting relation with the cap 66 so that the container 12 is moved from underneath the dud detecting mechanism without any actuation of the detector 39. Thus the detector 39 is moved clear and to a non-detecting position as the peripheral portion 69 moves under and away from the detector 39. The surfaces 57 and 58 are sloped so as not to engage the cap when a respective roller is in engagement therewith. The intersection of the surfaces forms a reference edge means for engaging the peripheral or reference portion 69 of the cap. The rollers 53 and 54 function as ramp means for lifting the detecting mechanism clear of the cap and for lowering the detecting mechanism as the inspected container moves from underneath the detecting mechanism.

Figure 8:
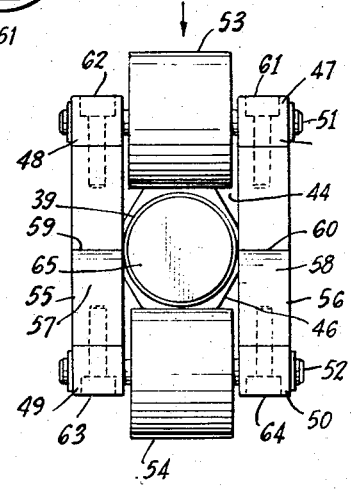
FIG. 8 is a bottom view of the detecting mechanism.

It is thus seen from the foregoing description that a detection mechanism has been developed which may be used to automatically inspect the flexure of the center portion or panel of small diameter caps without causing false sensing of the edge portion of the caps. The cylindrical shaped detector may inspect closures having a diameter slightly greater than the flat detecting surface of the detector. Thus the small diameter caps may be readily inspected. The shoes on opposite sides of the detector or sensing means are positioned closely adjacent or immediately beside the sensing means as best illustrated in FIG. 8. The apexes 59 and 60 are spaced below or laterally in relation to the longitudinal plane containing the detecting surface of the detector so as to recess the detecting surface 65. When the shoes engage the peripheral area of the cap around the center area of the cap, the shoes support the detector in an inspecting relation with the deformable portion of the cap. In this inspecting relation the detector senses the deformable portion when in an upward planar position, corresponding to the solid line representing the reference portion 69, and fails to sense the center area or deformable portion in the lower or concave position as best illustrated in FIGS. 3 to 5.

The rollers are also positioned on opposite sides of the detector and in a 90° relation to the shoes. Thus the rollers are in line with the detector as the sealed containers move into position for inspection. The apexes of the shoes are positioned at 90° to the movement of the container so as to support the detector in inspecting relation with the rollers in a non-contacting position. The lower surfaces of the rolers are tangential to a longitudinal plane which is laterally or vertically spaced a greater distance from the detecting surface towards the sealed container than the apexes of the shoes. The tangential portions of the rollers are positioned at a longitudinal distance to lift the detector to a non-detecting position when the rollers are in engagement with the reference or peripheral portion of the cap. In this embodiment the tangential portions are at a greater longitudinal distance from the detecting surface than the shoes. Thus as the sealed containers move past the detecting mechanism it is raised for maintaining the detector in a non-detecting position and lowered into a detecting position only when the shoes are in engagement with the closure.

In the foregoing embodiment the dud detecting mechanism is described for inspecting planar type caps. Caps having recessed panels may be inspected by lengthening the rollers 53, 54 so as to span the reference portion 69 on rolling across the cap. Although the invention is particularly applicable to inspecting small diameter caps, larger diameter caps may also be inspected by larger dud detecting mechanism.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. Apparatus for inspecting containers having caps with an inner deformable portion and an outer peripheral reference portion comprising a frame, means supporting said frame to move in a vertical direction, a detector mounted on said frame, reference means at the side of said detector and mounted on said frame, lift means at the front and rear of said detector and mounted in said frame crosswise to said reference means to raise said frame on engagement by caps on passing containers, said reference means extending below said detector for positioning said detector in an inspecting relation with a deformable portion of a cap on engagement of a reference portion, said lift means extending below said detector and spaced a greater distance from said detector than said reference means to raise said detector to a non-inspecting relation with the cap on passage under a lift means and to intermediately set said reference means on a reference portion of a cap between said lift means for inspection of a deformable portion by said detector.

2. Apparatus as set forth in claim 1 wherein said reference means has a downwardly facing V-shaped edge forming a contacting apex for engaging outer reference portions.

3. Apparatus as set forth in claim 1 wherein an additional reference means is provided on the opposite side of said detector from said other reference means and said lift means are rollers having axes of rotation crosswise to said reference means and spaced apart a greater distance than said two reference means for intermediately setting said two reference means on reference portions of caps positioned in non-engaging relation with said front and rear rollers.

4. Apparatus to inspect a container having a cap with a portion deformable in relation to a reference portion in response to difference in pressure between internal and external pressures comprising means for sensing deformable portions of longitudinally moving caps on sealed containers, first and second means for engaging caps of containers passing under said sensing means, said first means being closely adjacent laterally to said sensing means and extending downwardly beyond said sensing means for positioning said sensing means in an inspecting relation with a deformable portion of a cap on engagement of a reference portion, said second means extending downwardly beyond said sensing means a greater distance than said first means to position said sensing means in a non-inspecting relation with a cap sealing a container on passage under said second means and said second means being longitudinally spaced a greater distance from said sensing means than the spacing of said first means in a direction crosswise to the longitudinal spacing of said second means and said sensing means for disengaging said second means from caps and setting said first means on reference portions to position said sensing means in inspecing relation with deformable portions.

5. Apparatus as set forth in claim 4 wherein said first and second means are spaced from said sensing means along axes normal to one another to align said second means and said sensing means in direction of relative movement of said sensing means and containers presented for inspection.

6. Apparatus as set forth in claim 5 wherein said first means are positioned on opposite sides of said sensing means.

7. Apparatus as set forth in claim 5 wherein said second means are positioned on opposite sides of said sensing means and at right angles to said first means.

8. Apparatus as set forth in claim 5 wherein said first means are on opposite sides of said sensing means and said second means are on opposite sides of said sensing means and at right angles to the position of said first means.

9. Apparatus as set forth in claim 4 wherein said sensing means is circular and has a diameter of the same order as a generally inner disc-shaped circular deformable portion with a circumferentially exterior reference portion.

10. Apparatus as set forth in claim 9 wherein said first means are on opposite sides of said sensing means and both have an angular edge immediately beside said sensing means and extending radially to said sensing means for engaging a reference portion immediately exterior to a deformable portion.

11. Apparatus as set forth in claim 10 wherein said second means are rollers positioned at the front and rear of said sensing means respectively with said rollers extending parallel to said angular edges and forming cylindrical surfaces longitudinally spaced a greater distance from said sensing means than said angular edges.

12. Apparatus to inspect containers having caps with disc-shaped portions bendable in relation to a peripheral reference portion comprising a cylindrically shaped sensing means having a downwardly facing flat disc-shaped surface for inspecting a bendable portion of a container, a frame having a planar rectangular panel with four spaced posts extending normal thereto on the same side to form between said posts opposite side spaces and opposite front and rear spaces, said sensing means mounted in a normal position on said panel on the same side as said posts and centered in relation to said posts, shoes having downwardly facing V-shaped bottom surfaces mounted between said posts in said side spaces on opposite sides of said sensing means and said V-shaped surfaces having apexes aligned with the center of said disc-shaped surface and positioned a greater distance from said panel than said disc-shaped surface to engage reference portions of caps for vertically positioning said disc-shaped surface in a sensing relation with bendable portions of caps, leading and trailing rollers rotatably mounted in said posts in said front and rear spaces in alignment with said sensing means in the direction of relative movement between said sensing means and caps presented for inspection, said rollers having cylindrical surfaces having downwardly facing portions further from said panel than said disc-shaped surface and said apexes and positioned further from the center of the disc-shaped surface than said apexes so that said leading and trailing rollers successively and separately engage reference portions of caps to support said disc-shaped surface in a non-detecting position on movement into and from an inspecting relation and are in a non-engaging relation with caps during inspection to permit said shoes to form the sole support for said sensing means during the inspecting relation.

References Cited

UNITED STATES PATENTS

| | | |
|---|---|---|
| 3,137,160 | 6/1964 | Mathias. |
| 3,206,027 | 9/1965 | Bailey. |
| 3,295,676 | 1/1967 | Ochs. |
| 3,371,781 | 3/1968 | Armbruster et al. |

SAMUEL S. MATTHEWS, *Primary Examiner.*

U.S. Cl. X.R.

33—174; 209—90; 324—34